(12) United States Patent  
Sato et al.

(10) Patent No.: US 8,387,364 B2  
(45) Date of Patent: Mar. 5, 2013

(54) EXHAUST GAS PURIFYING APPARATUS FOR INTERNAL COMBUSTION ENGINE

(75) Inventors: Daisuke Sato, Wako (JP); Hidetaka Maki, Wako (JP); Eisaku Gosyo, Wako (JP); Atsushi Izumiura, Wako (JP); Jun Iida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 913 days.

(21) Appl. No.: 12/372,306

(22) Filed: Feb. 17, 2009

(65) Prior Publication Data  
US 2009/0211235 A1 Aug. 27, 2009

(30) Foreign Application Priority Data  
Feb. 25, 2008 (JP) .................................... 2008-43335

(51) Int. Cl.  
*F01N 3/00* (2006.01)

(52) U.S. Cl. ................ 60/277; 60/274; 60/295; 60/297; 60/311

(58) Field of Classification Search .................... 60/276, 60/277, 295, 297, 311, 274  
See application file for complete search history.

(56) References Cited

U.S. PATENT DOCUMENTS

| 6,722,120 B2 * | 4/2004 | Plote .............................. 60/276 |
| 7,104,049 B2 * | 9/2006 | Hiranuma et al. ............... 60/297 |
| 7,281,369 B2 * | 10/2007 | Emi et al. ........................ 60/297 |

FOREIGN PATENT DOCUMENTS  
JP 2002-070619 A 3/2002

* cited by examiner

*Primary Examiner* — Thomas Denion  
*Assistant Examiner* — Diem Tran  
(74) *Attorney, Agent, or Firm* — Arent Fox LLP

(57) ABSTRACT

An exhaust gas purifying apparatus for an internal combustion engine having a particulate filter provided in an exhaust system of the engine. Regeneration control is performed of burning particulates accumulated in the particulate filter. An oxygen concentration in exhaust gases flowing into the particulate filter is detected, and a flow rate of oxygen flowing into the particulate filter is calculated according to the detected oxygen concentration. An inflowing oxygen amount is calculated by integrating the oxygen flow rate when performing regeneration control. It is determined that an abnormality has occurred if the inflowing oxygen amount at a time when regeneration control ends is equal to or less than a predetermined amount.

3 Claims, 4 Drawing Sheets

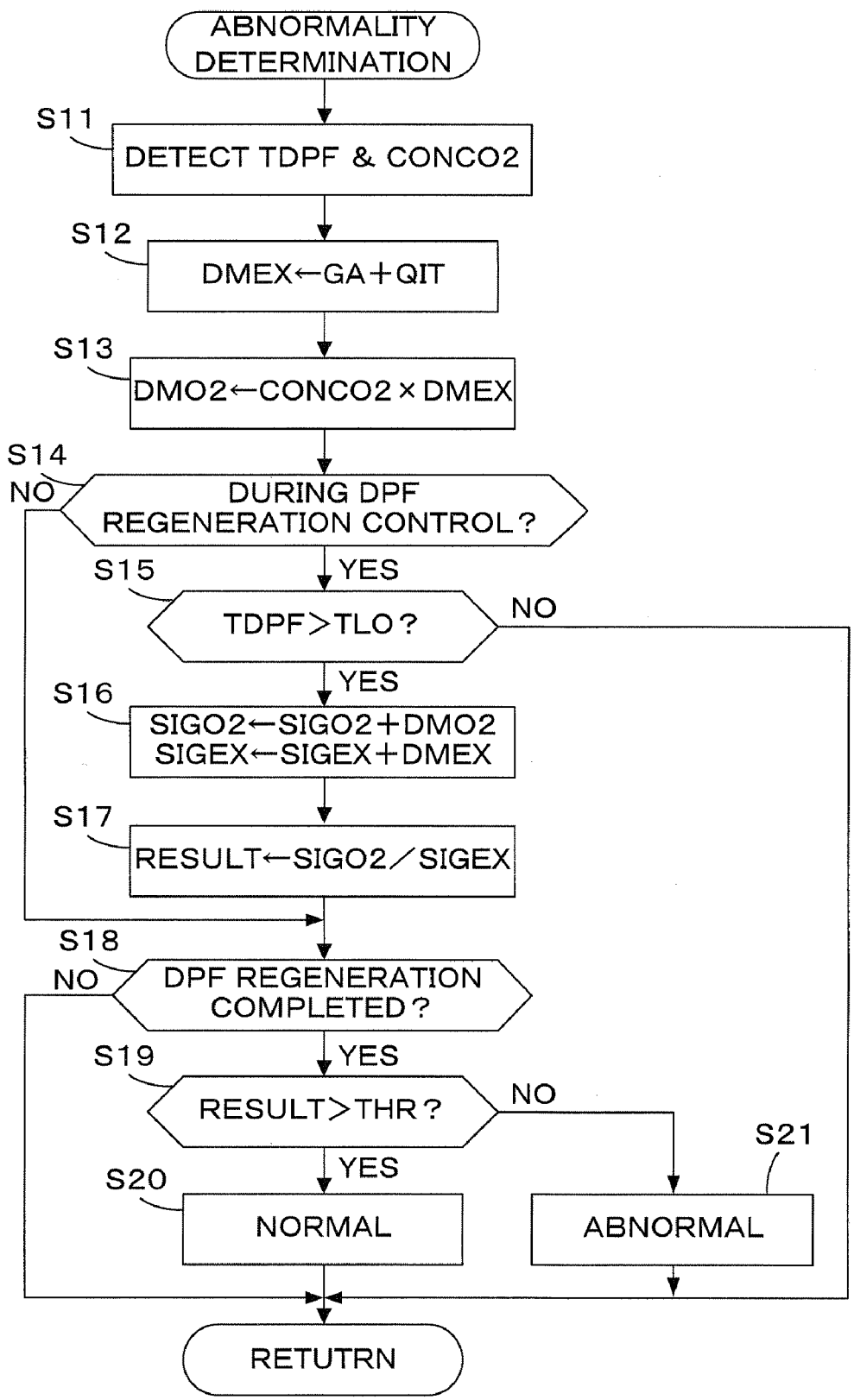

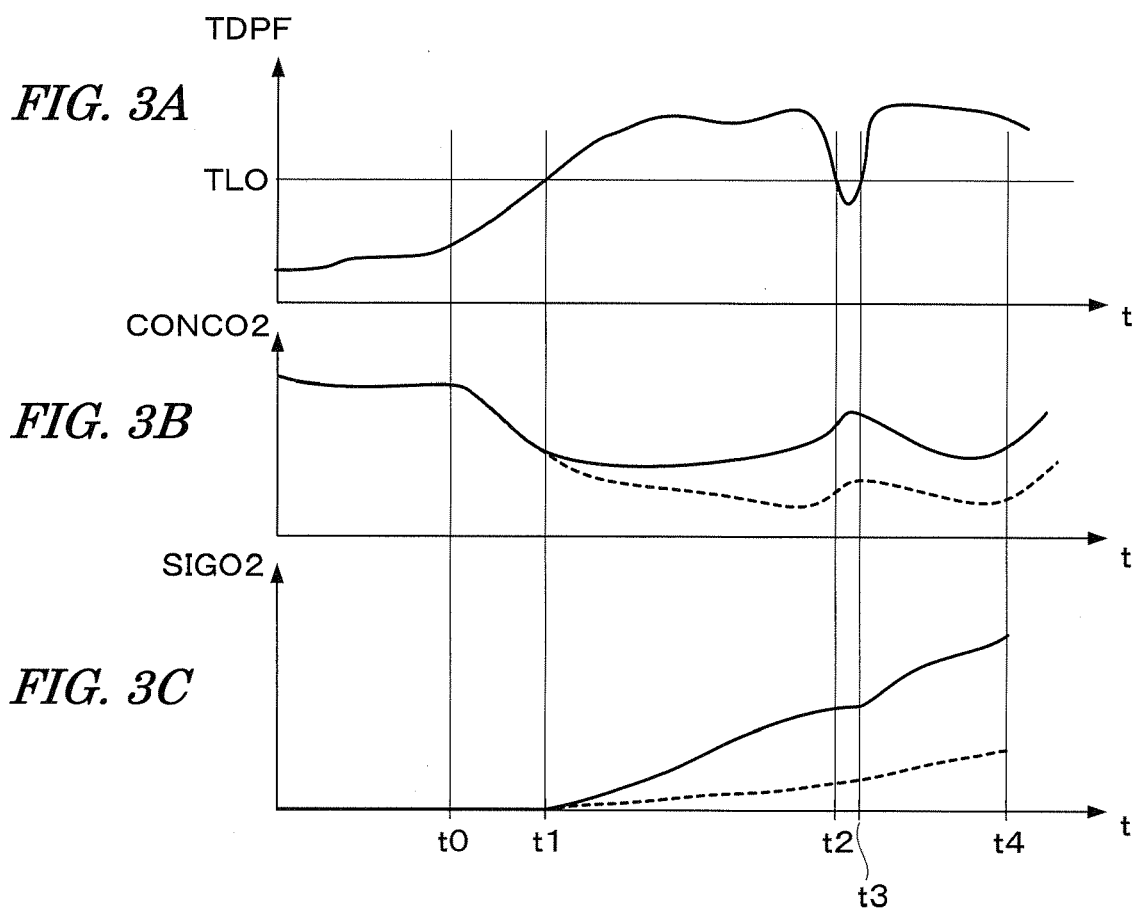
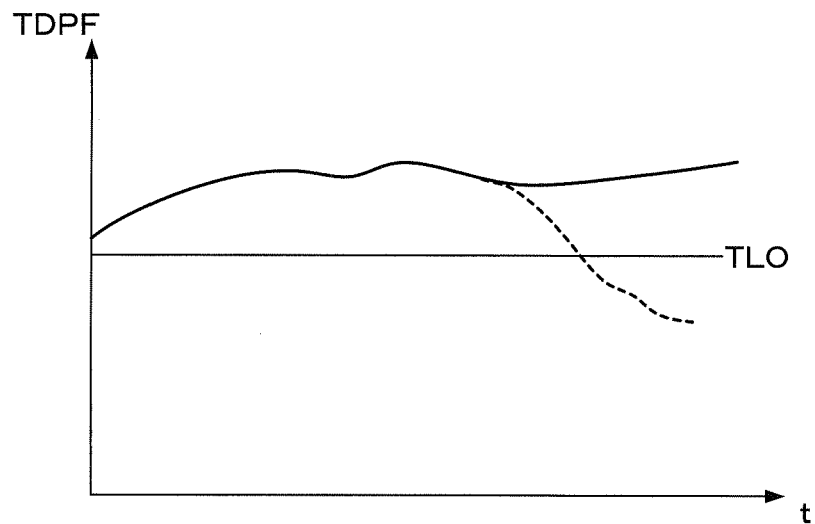

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine, and particularly to an exhaust gas purifying apparatus having a particulate filter in an exhaust system, wherein the exhaust gas purifying apparatus performs an abnormality determination in regeneration control that is executed while burning particulates accumulated in the particulate filter.

2. Description of the Related Art

Japanese Patent Laid-open No. 2002-70619 (JP-'619) discloses a method for determining an abnormality in the regeneration control of a diesel particulate filter (hereinafter referred to as "DPF"). According to the method disclosed in JP-'619, two oxygen concentration sensors are provided, respectively, upstream and downstream of the DPF in the exhaust system, and an upstream side oxygen concentration and a downstream side oxygen concentration are detected. Further, an oxygen concentration change rate, which is a rate of change in a difference between the upstream side oxygen concentration and the downstream side oxygen concentration (concentration difference), is calculated. It is determined that an abnormal temperature rise of the DPF occurs when the oxygen concentration change rate is greater than a predetermined change rate for a predetermined time period or longer.

The method disclosed in JP-'619 is used with a control system wherein a temperature rise in the DPF is estimated according to the oxygen concentration change rate, and an intake air flow rate of the engine is adjusted according to the estimated temperature increase.

However, in a control system wherein the above-described adjustment of the intake air flow rate is not performed, it is necessary to determine if an abnormality in regeneration control has occurred wherein an amount of oxygen flowing into the DPF is insufficient and the accumulated particulates can not sufficiently burn during execution of the regeneration control.

Further, when performing regeneration control of the particulate filter, the injected fuel is used for burning the particulates. If the fuel supply state is abnormal (especially if an excessive amount of fuel is supplied), too much oxygen is consumed by the excessive amount of fuel before the oxygen can reach the particulate filter. Consequently, the amount of oxygen is insufficient for burning the particulates trapped in the particulate filter. Therefore, it is also necessary to determine that such an abnormality is present.

SUMMARY OF THE INVENTION

The present invention was made contemplating the above-described point, and an aspect of the present invention is to provide an exhaust gas purifying apparatus for an internal combustion engine, which can determine, with a relatively simple configuration, if an abnormality in the regeneration control of the particulate filter is present wherein the accumulated particulates can not sufficiently burn.

To attain the above aspect and other aspects, the present invention provides an exhaust gas purifying apparatus for an internal combustion engine having a particulate filter located in an exhaust system of the engine. The exhaust gas purifying apparatus includes regeneration control means, oxygen concentration detecting means, oxygen flow rate calculating means, inflowing oxygen amount calculating means, and determining means. The regeneration control means performs regeneration control for burning particulates accumulated in the particulate filter. The oxygen concentration detecting means detects an oxygen concentration (CONCO2) in exhaust gases flowing into the particulate filter. The oxygen flow rate calculating means calculates a flow rate (DMO2) of oxygen flowing into the particulate filter according to the detected oxygen concentration (CONCO2). The inflowing oxygen amount calculating means calculates an inflowing oxygen amount (SIGO2) by integrating the oxygen flow rate (DMO2) calculated by the oxygen flow rate calculating means when performing the regeneration control. The determining means determines that an abnormality has occurred if the inflowing oxygen amount (SIGO2), at the time the regeneration control ends, is equal to or less than a predetermined amount (THO2).

With the above-described structural configuration, the oxygen concentration in the exhaust gases flowing into the particulate filter is detected, and the flow rate of the oxygen flowing into the particulate filter is calculated according to the detected oxygen concentration. The inflowing oxygen amount is calculated by integrating the oxygen flow rate during execution of the regeneration control. It is determined that an abnormality in the regeneration control has occurred if the inflowing oxygen amount, at the time the regeneration control ends, is equal to or less than a predetermined amount. The approximate value of the amount of oxygen required for completing regeneration of the particulate filter is previously known. Therefore, when the amount of oxygen actually flowing into the particulate filter is substantially less than the required oxygen amount, it is possible to determine that the regeneration control is not being performed properly and the accumulated particulates have not completely burned. Consequently, the abnormality determination of the regeneration control is performed using a relatively simple configuration.

The exhaust gas purifying apparatus may further include temperature detecting means for detecting a temperature (TDPF) in the vicinity of the particulate filter. The inflowing oxygen amount calculating means calculates the inflowing oxygen amount (SIGO2) when the regeneration control is performed and the temperature (TDPF) detected by the temperature detecting means is higher than a predetermined temperature (TLO).

With the above-described structural configuration, when regeneration control is performed and the temperature in the vicinity of the particulate filter (filter temperature) is higher than the predetermined temperature, the inflowing oxygen amount is calculated. When the filter temperature is relatively low, the particulates do not burn even if oxygen is supplied. Therefore, by calculating the inflowing oxygen amount when the filter temperature is higher than the predetermined temperature, the determination of whether an abnormality in the regeneration control has occurred is performed accurately.

Further, according to another embodiment of the present invention, an exhaust gas purifying apparatus for an internal combustion engine has a particulate filter provided in an exhaust system of the engine. The exhaust gas purifying apparatus includes regeneration control means, oxygen concentration detecting means, oxygen flow rate calculating means, inflowing oxygen amount calculating means, exhaust gas flow rate calculating means, inflowing exhaust gas amount calculating means, and determining means. The exhaust gas flow rate calculating means calculates a flow rate (DMEX) of exhaust gases flowing into the particulate filter. The inflowing exhaust gas amount calculating means calculates an amount (SIGEX) of inflowing exhaust gases by integrating the exhaust gas flow rate (DMEX) calculated by the exhaust flow rate calculating means when performing regeneration control. The determination parameter calculating means calculates a determination parameter (RESULT) indicative of a relationship between the inflowing oxygen amount (SIGO2) and the inflowing exhaust gas amount (SIGEX) at the time regeneration control ends. The determining means determines an abnormality in the regeneration control according to a relationship between the determination parameter (RESULT) and a predetermined value (THR).

With the above-described structural configuration, the oxygen concentration in the exhaust gases flowing into the particulate filter is detected, and the flow rate of the oxygen flowing into the particulate filter is calculated according to the detected oxygen concentration. The inflowing oxygen amount is calculated by integrating the oxygen flow rate when performing the regeneration control. Further, the flow rate of the exhaust gases flowing into the particulate filter is calculated, the inflowing exhaust gas amount is calculated by integrating the exhaust gas flow rate when performing regeneration control, and a determination parameter indicative of the relationship between the inflowing oxygen amount and the inflowing exhaust gas amount at the time the regeneration control ends is calculated. Then, an abnormality in the regeneration control is determined according to the relationship between the determination parameter and the predetermined value. It is considered that the amount of oxygen that contributes to burning the particulates changes depending on the amount of exhaust gases flowing into the particulate filter. Therefore, by using, for example, the ratio indicative of the relationship between the inflowing exhaust gas amount and the inflowing oxygen amount as the determination parameter, the abnormality determination is performed more accurately, taking influence of the inflowing exhaust gas amount into account.

BRIEF DESCRIPTION OF THE DRAWINGS

FIG. 2 is a flowchart of a process for determining an abnormality in the regeneration control of the DPF according to the first embodiment of the present invention;

FIGS. 3A-3C are time charts illustrating the process of FIG. 2;

FIG. 4 is a time chart illustrating changes in the temperature (TDPF) of the DPF.

DETAILED DESCRIPTION OF THE PREFERRED EMBODIMENTS

Preferred embodiments of the present invention will now be described with reference to the drawings.

Figure 1:
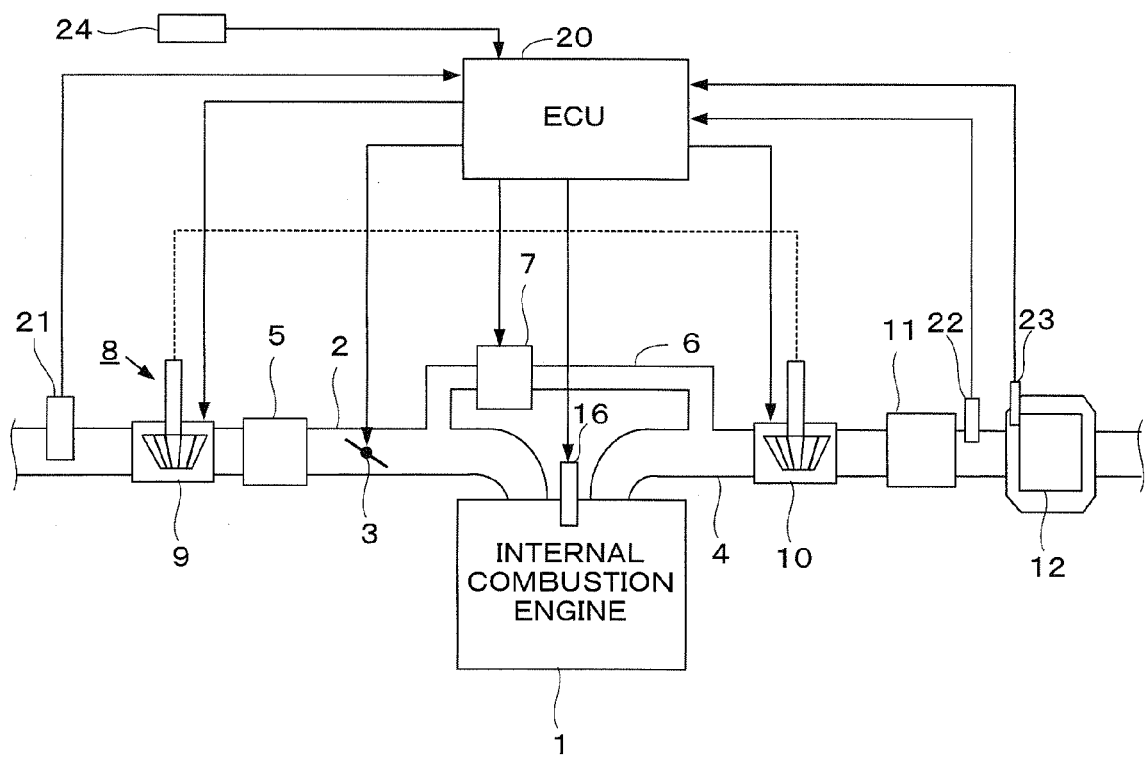
FIG. 1 is a schematic diagram of an internal combustion engine and a control system therefore according to a first embodiment of the present invention.

FIG. 1 is a schematic diagram showing a configuration of an internal combustion engine and a control system therefore according to a first embodiment of the present invention. An internal combustion engine 1 (hereinafter referred to simply as "engine") is a diesel engine in which fuel is injected directly into cylinders, wherein each cylinder is provided with a fuel injection valve 16. The fuel injection valve 16 is electrically connected to an electronic control unit 20 (hereinafter referred to as "ECU"). A valve opening period and a valve opening timing of the fuel injection valve 16 are controlled by the ECU 20.

The engine 1 is provided with an intake pipe 2, an exhaust pipe 4, and a turbocharger 8. The turbocharger 8 has a turbine 10 driven by the kinetic energy of exhaust gases and a compressor 9 for compressing the intake air. The compressor 9 is rotationally driven by the turbine 10.

The turbine 10 has a plurality of movable vanes (not shown), and is configured so that the rotational speed of the turbine 10 is adjusted by changing an opening of the movable vanes (hereinafter referred to as "vane opening"). The vane opening of the turbine 10 is electro-magnetically controlled by the ECU 20.

An intercooler 5 for cooling the pressurized air and an intake shutter 3 (throttle valve) for controlling an intake air amount are disposed downstream of the compressor 9 in the intake pipe 2. The opening and closing of the intake shutter 3 is controlled by the ECU 20 through an actuator not shown.

An exhaust gas recirculation passage 6 is provided between the upstream side of the turbine 10 in the exhaust pipe 4 and the downstream side of the intake shutter 5 in the intake pipe 2. The exhaust gas recirculation passage 6 recirculates exhaust gases to the intake pipe 2. The exhaust gas recirculation passage 6 is provided with an exhaust gas recirculation control valve 7 (hereinafter referred to as "EGR valve") for controlling an exhaust gas recirculation amount. The EGR valve 7 is an electromagnetic valve having a solenoid is controlled by the ECU 20.

The exhaust pipe 4 is provided with a catalytic converter 11 for purifying the exhaust gases, an oxygen concentration sensor 22 for detecting an oxygen concentration CONCO2 in the exhaust gases, and a diesel particulate filter 12 (hereinafter referred to as "DPF") in the listed order starting from the upstream side of the turbine 10. The oxygen concentration sensor 22 detects an oxygen concentration in the exhaust gases flowing into the DPF 12. A DPF temperature sensor 23, for detecting a temperature of the DPF 12 (hereinafter referred to as "DPF temperature"), is disposed in the DPF 12. The detection signals of the sensors 22 and 23 are supplied to the ECU 20.

The catalytic converter 11 contains an oxidation catalyst for accelerating oxidization of hydrocarbon and carbon monoxide in the exhaust gases. Further, the catalytic converter 11 may be include a NOx adsorbent and a catalyst for reducing NOx.

The DPF 12 traps soot which consists of particulates (particulate matter), whose main component is carbon (C), in the exhaust gases when the exhaust gases pass through holes defined in the filter wall. Specifically, the inflowing soot is accumulated on the surface of the filter wall, as well as in the holes of the filter wall. For example, ceramics and other types of porous materials such as silicon carbide (SiC), are the types of materials used to manufacture the filter wall. A regeneration control for burning the particulates accumulated in the DPF 12 is timely performed. The regeneration control is performed, for example, by executing a post-injection (fuel injection in the exhaust stroke). That is, oxidization of the post-injected fuel is accelerated by the oxidation catalyst in the catalytic converter 11, and the temperature of the exhaust gases flowing into the DPF 12 rises, wherein the accumulated particulates are burned.

Further, a crank angle position sensor 24, an intake air flow rate sensor 21, a coolant temperature sensor (not shown), and the like are provided. The crank angle position sensor 24 detects a rotational angle of the crankshaft of the engine 1, the intake air flow rate sensor 21 detects an intake air flow rate GA of the engine 1, and the coolant temperature sensor detects a coolant temperature of the engine 1. The detection signals of the sensors 21 and 24 are supplied to the ECU 20. The rotational speed NE of the engine 1 is calculated from the output of the crank angle position sensor 24.

The ECU 20 includes an input circuit having various functions including a function of shaping the waveform of input signals from the various sensors, correcting the voltage levels of the input signals to a predetermined level, and converting analog signal values into digital signal values. The ECU 20 further includes a central processing unit (hereinafter referred to as "CPU"), a memory circuit, and an output circuit. The memory circuit preliminarily stores various operating programs to be executed by the CPU, as well as computation results and the like that were performed by the CPU. The output circuit supplies control signals to the fuel injection valve 16, the EGR valve 7, and the like.

FIG. 2 is a flowchart of a process for determining an abnormality in the regeneration control of the DPF 12. The process is executed at predetermined time intervals in the CPU of the ECU 20.

In step S11, a DPF temperature TDPF and an oxygen concentration CONCO2 are detected. In step S12, the intake air flow rate GA detected by the intake air flow rate sensor 21 and a total fuel injection amount QIT per unit time period are applied to equation (1) to calculate an exhaust flow rate DMEX. The total fuel injection amount QIT includes an amount of fuel injected in at least one pilot injection and a main injection, and further includes an amount of fuel injected in the post-injection when performing the post-injection.

$$DMEX = GA + QIT \quad (1)$$

In step S13, the oxygen concentration CONCO2 and the exhaust flow rate DMEX are applied to equation (2) to calculate an oxygen flow rate DMO2 flowing into the DPF 12.

$$DMO2 = CONCO2 \times DMEX \quad (2)$$

In step S14, it is determined whether regeneration control of the DPF is being performed. If the answer to step S14 is negative (NO), the process immediately proceeds to step S18. If DPF regeneration control is being performed, it is determined whether the DPF temperature TDPF is higher than a predetermined lower limit temperature TLO (e.g., 500 degrees centigrade) (step S15). If the answer to step S15 is negative (NO), the process immediately ends. The predetermined lower limit temperature TLO is the lowest temperature that enables the soot accumulated in the DPF 12 to burn.

If TDPF is higher than TLO in step S15, the oxygen flow rate DMO2 and the exhaust flow rate DMEX indicative of flow rates of oxygen and exhaust gases flowing into the DPF 12 are integrated by equations (3) and (4) to calculate an inflowing oxygen amount SIGO2 and an inflowing exhaust gas amount SIGEX (step S16). "SIGO2" and "SIGEX" on the right side of equations (3) and (4) are preceding calculated values.

$$SIGO2 = SIGO2 + DMO2 \quad (3)$$

$$SIGEX = SIGEX + DMEX \quad (4)$$

In step S17, the inflowing oxygen amount SIGO2 and the inflowing exhaust gas amount SIGEX are applied to equation (5) to calculate a determination parameter RESULT.

$$RESULT = SIGO2/SIGEX \quad (5)$$

In step S18, it is determined whether regeneration control of the DPF 12 is completed. If regeneration control of the DPF 12 is not completed, the process immediately ends. If the answer to step S18 is affirmative (YES), it is determined whether the determination parameter RESULT is greater than a determination threshold value THR (step S19). If the answer to step S19 is affirmative (YES), it is determined that the regeneration control has been normally performed (step S20). On the other hand, when RESULT is equal to or less than THR, it is determined that an abnormality has occurred in the regeneration control (step S21). It is considered that the following abnormality, for example, has occurred: an abnormality that the fuel injection amount in the post-injection is too much and the amount of oxygen flowing into the DPF 12 is not enough, or an abnormality that the fuel injection amount in the post-injection is too little and the time period in which the DPF temperature TDPF is less than the predetermined lower limit temperature TLO is relatively long.

FIGS. 3A-3C are time charts for illustrating the process of FIG. 2. FIG. 3A shows changes in the DPF temperature TDPF, FIG. 3B shows changes in the oxygen concentration CONCO2, and FIG. 3C shows changes in the inflowing oxygen amount SIGO2 when the DPF regeneration control is started at time t0. It is to be noted that the dashed line in FIGS. 3B and 3C corresponds to an example where it is determined that an abnormality has occurred in the regeneration control.

When the DPF temperature TDPF exceeds the predetermined lower limit temperature TLO at time t1, the integration of the inflowing oxygen amount SIGO2 is started. In the time period from time t2 to time t3, the DPF temperature TDPF temporarily drops below the predetermined lower limit temperature TLO. Accordingly, the inflowing oxygen amount SIGO2 is maintained at the same value. The DPF regeneration control is completed at time t4.

In the example shown by the solid line, the inflowing oxygen amount SIGO2 becomes sufficient and the determination parameter RESULT exceeds the determination threshold value THR. Therefore, it is determined that the regeneration control has been normally performed. On the other hand, in the example shown by the dashed line, the inflowing oxygen amount SIGO2 is insufficient due to low oxygen concentration CONCO2. Accordingly, the determination threshold value THR becomes less than the determination parameter RESULT, and it is determined that an abnormality has occurred in the regeneration control.

FIG. 4 shows changes in the DPF temperature TDPF in another example. The solid line corresponds to a normal example and the dashed line corresponds to an abnormal example. Changes in the temperature shown by the dashed line indicate that the soot has not sufficiently burned since the DPF temperature TDPF decreased in the middle of the regeneration control.

As described above, in this embodiment the inflowing oxygen amount SIGO2, indicating the amount of oxygen flowing into the DPF 12 and the inflowing exhaust gas amount SIGEX, indicating the amount of exhaust gases flowing into the DPF 12 when performing the regeneration control of the DPF 12, are calculated. Further, the determination parameter RESULT is calculated by dividing the inflowing oxygen amount SIGO2 by the inflowing exhaust gas amount SIGEX. When the determination parameter RESULT is less than or equal to the determination threshold value THR, it is determined that an abnormality has occurred in the regeneration control. Therefore, the abnormality that the amount of oxygen flowing into the DPF 12 is insufficient and the accumulated soot is not sufficiently burned is determined using an apparatus having a relatively simple structure. Further, it is considered that the amount of oxygen that contributes to burning the particulates changes depending on the inflowing exhaust gas amount SIGEX. Therefore, by using the determination parameter RESULT, the abnormality determination is performed more accurately, taking influence of the inflowing exhaust gas amount SIGEX into account.

In this embodiment, the oxygen concentration sensor 22 and the DPF temperature sensor 23 correspond, respectively, to the oxygen concentration detecting means and the temperature detecting means. The ECU 20 includes the regeneration control means, the oxygen flow rate calculating means, the inflowing oxygen amount calculating means, the exhaust gas flow rate calculating means, the inflowing exhaust gas amount calculating means, the determination parameter calculating means, and the determining means. Further, the intake air flow rate sensor 21 defines a part of the exhaust gas flow rate calculating means. Specifically, steps S12 and S13 of FIG. 2 correspond respectively to the exhaust gas flow rate calculating means and the oxygen flow rate calculating means. Step S16 corresponds to the inflowing oxygen amount calculating means and the inflowing exhaust gas amount calculating means. Step S17 corresponds to the determination parameter calculating means. Steps S18 to S21 correspond to the determining means.

Figure 5:
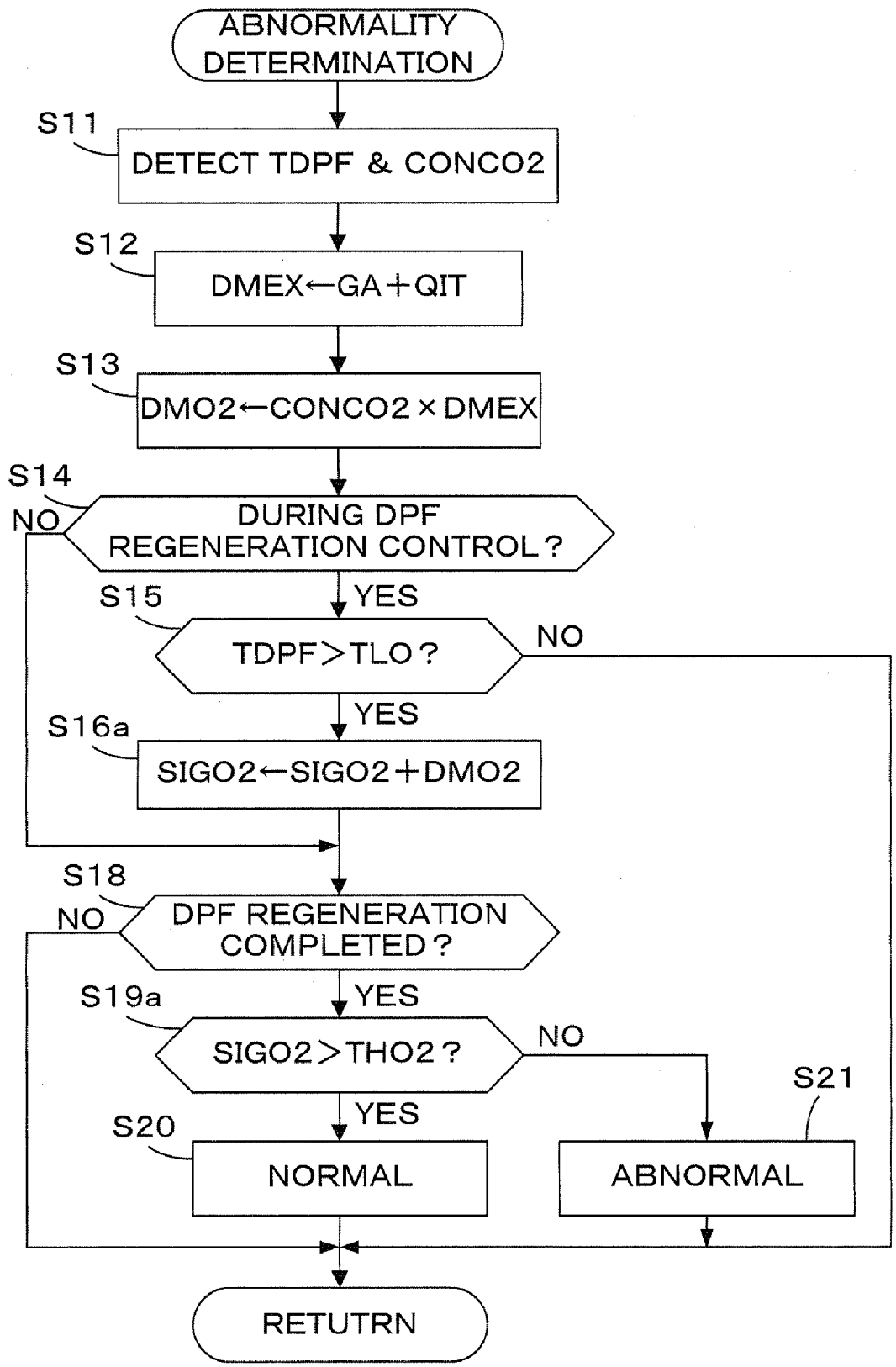
FIG. 5 is a flowchart of a process for determining an abnormality in the regeneration control of the DPF according to a second embodiment of the present invention.

In the second embodiment of the present invention, the abnormality determination is performed according to the inflowing oxygen amount SIGO2 without calculating the determination parameter RESULT. FIG. 5 is a flowchart of the abnormality determination process of the second embodiment. The flowchart shown in FIG. 5 is obtained by deleting step S17 in FIG. 2 and replacing steps S16 and S19, respectively, with steps S16a and S19a. Except for these points, the flowchart of FIG. 5 is the same as FIG. 2 of the first embodiment.

In step S16a, the inflowing oxygen amount SIGO2 is calculated using equation (3). In step S19a, it is determined whether the inflowing oxygen amount SIGO2 is greater than an oxygen amount threshold value THO2. If the answer to step S19a is affirmative (YES), it is determined that the regeneration control has been performed normally (step S20). If SIGO2 is equal to or less than THO2, it is determined that an abnormality has occurred (step S21).

In the second embodiment, if the inflowing oxygen amount SIGO2 at the time of the completion of the regeneration control is equal to or less than the oxygen amount threshold value THO2, it is determined that an abnormality has occurred due to the soot having not burned completely due to a shortage in the amount of oxygen. Therefore, the abnormality determination of the regeneration control is performed using an apparatus having a relatively simple structure.

In the second embodiment, steps S18, S19a, S20 and S21 in FIG. 5 correspond to the determining means.

The present invention is not limited to the embodiments described above, and various modifications may be made thereto. For example, in the first embodiment, the ratio SIGO2/SIGEX is used as the determination parameter RESULT. Alternatively, the ratio SIGEX/SIGO2 may be used. In such case, it is determined that the regeneration control has been performed normally if the determination parameter RESULT is less than the determination threshold value THR', while it is determined that an abnormality has occurred if the determination parameter is equal to or greater than the determination threshold value THR'.

Further, the mounting position of the DPF temperature sensor 23 is not limited to the position shown in FIG. 1. The DPF temperature sensor 23 may be mounted in a position where the temperature in the vicinity of the DPF 12 can be detected.

Further, it is not necessary to provide the catalytic converter 11 only for burning the fuel injected by post-injection. For example, the DPF 12 may carry an oxidation catalyst as shown in JP-'619. Further, the execution timing of the post-injection may be advanced to a timing in the combustion stroke to burn the fuel injected by the post-injection in the combustion chamber.

The present invention may also be applied to an exhaust gas purifying apparatus for a watercraft propulsion engine, such as an outboard engine, having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust gas purifying apparatus for an internal combustion engine having a particulate filter provided in an exhaust system of said engine, said exhaust gas purifying apparatus comprising:
    regeneration control means for performing regeneration control of burning particulates accumulated in the particulate filter;
    oxygen concentration detecting means for detecting an oxygen concentration in exhaust gases flowing into the particulate filter;
    oxygen flow rate calculating means for calculating a flow rate of oxygen flowing into the particulate filter according to the detected oxygen concentration;
    inflowing oxygen amount calculating means for calculating an inflowing oxygen amount by integrating the oxygen flow rate calculated by the oxygen flow rate calculating means when performing regeneration control;
    determining means for determining an abnormality has occurred in the regeneration control if the inflowing oxygen amount at a time when regeneration control ends is equal to or less than a predetermined amount; and
    temperature detecting means for detecting a temperature in a vicinity of the particulate filter, wherein the inflowing oxygen amount calculating means calculates the inflowing oxygen amount when the regeneration control is performed and the temperature detected by the temperature detecting means is higher than a predetermined temperature.

2. An exhaust gas purifying method for an internal combustion engine having a particulate filter provided in an exhaust system of said engine, said exhaust gas purifying method comprising the steps of:
    a) performing regeneration control of burning particulates accumulated in the particulate filter;
    b) detecting an oxygen concentration in exhaust gases flowing into the particulate filter;
    c) calculating a flow rate of oxygen flowing into the particulate filter according to the detected oxygen concentration;
    d) calculating an inflowing oxygen amount by integrating the oxygen flow rate calculated in step c) when performing regeneration control;
    e) determining that an abnormality has occurred in the regeneration control if the inflowing oxygen amount at a time when regeneration control ends is equal to or less than a predetermined amount; and
    f) detecting a temperature in a vicinity of the particulate filter, wherein the inflowing oxygen amount is calculated when the regeneration control is performed and the temperature detected in step f) is higher than a predetermined temperature.

3. A computer program embodied on a computer-readable medium that causes a computer to implement an exhaust gas purifying method for an internal combustion engine having a particulate filter provided in an exhaust system of said engine, said exhaust gas purifying method comprising the steps of:
   a) performing regeneration control of burning particulates accumulated in the particulate filter;
   b) detecting an oxygen concentration in exhaust gases flowing into the particulate filter;
   c) calculating a flow rate of oxygen flowing into the particulate filter according to the detected oxygen concentration;
   d) calculating an inflowing oxygen amount by integrating the oxygen flow rate calculated in step c) when performing the regeneration control;
   e) determining an abnormality has occurred in the regeneration control if the inflowing oxygen amount at a time when regeneration control ends is equal to or less than a predetermined amount; and
   f) detecting a temperature in a vicinity of the particulate filter, and the inflowing oxygen amount is calculated when regeneration control is performed and the temperature detected in step f) is higher than a predetermined temperature.

* * * * *